United States Patent [19]

Alford et al.

[11] Patent Number: 5,093,089
[45] Date of Patent: Mar. 3, 1992

[54] PROCESS FOR THE SEPARATION OF SULPHATE

[75] Inventors: Raymond E. Alford; Felix M. Mok, both of Vancouver, Canada

[73] Assignee: Chemetics International Company Ltd., Vancouver, Canada

[21] Appl. No.: 552,620

[22] Filed: Jul. 16, 1990

[51] Int. Cl.⁵ .............................................. C01G 37/00
[52] U.S. Cl. ...................................... 423/55; 423/193; 423/184; 423/190; 423/551
[58] Field of Search ................. 423/475, 55, 193, 184, 423/551, 190, 191

[56] References Cited

U.S. PATENT DOCUMENTS

| | | | |
|---|---|---|---|
| 3,970,528 | 6/1976 | Zirngiebl et al. | 423/193 |
| 4,132,759 | 1/1979 | Schafer | 423/161 |
| 4,259,297 | 3/1981 | Kaczur et al. | 423/55 |
| 4,268,486 | 5/1981 | Noack et al. | 423/55 |
| 4,636,376 | 1/1987 | Maloney et al. | 423/475 |
| 4,702,805 | 10/1987 | Burkell et al. | |
| 4,795,535 | 1/1989 | Bolduc et al. | 423/475 |

Primary Examiner—Theodore Morris
Assistant Examiner—Edward Squillante
Attorney, Agent, or Firm—C. Brian Barlow

[57] ABSTRACT

Process for separating sulphate from a contaminating chromium component contained in an aqueous liquor by the crystallization of a sulphate compound. The sulphate may be separated substantially free of chromium component by adjustment of the pH to the range of from about 2.0 to about 6.5, followed by cooling of the liquor to precipitate the sulphate compound from solution which sulphate is subsequently removed. The process provides an effective method for the separation of sulphate from dichromate, and is particularly useful in the production of chlorate.

9 Claims, No Drawings

PROCESS FOR THE SEPARATION OF SULPHATE

FIELD OF THE INVENTION

This invention relates to a process for the separation of an alkali metal sulphate from an undesired chromium component impurity contained in an aqueous liquor. More particularly, it relates to the separation of sodium sulphate, substantially free of chromate, in crystalline chlorate manufacture.

BACKGROUND OF THE INVENTION

Sodium chlorate is generally prepared by the electrolysis of sodium chloride wherein the sodium chloride is electrolyzed to produce chlorine, sodium hydroxide and hydrogen. The chlorine and sodium hydroxide are immediately reacted to form sodium hypochlorite, which is then converted to chlorate and chloride under controlled conditions of pH and temperature.

Thus, within the electrolytic system, sodium chloride is, in effect, combined with water to form sodium chlorate and hydrogen gas. The electrolysis takes place typically at 60° C. to 90° C. in electrolytic cells comprising anodes, which may be a precious metal or metal oxide coated titanium, and cathodes, which may be steel.

It is common practice in the electrolysis of brines in the production of halates, such as sodium chlorate, to add a chromate (chromium VI), usually in the form of dichromate, typically sodium dichromate, to the electrolyte as a means of improving the overall efficiency. The chromate prevents loss of current efficiency at the cathode, reduces side reactions and improves the conversion of the hypohalite to the halate, e.g. hypochlorite to chlorate. The chromium VI is not consumed by the process and leaves with the metal halate/brine solution.

Chlorate manufacturing plants situated close to an associated, or dedicated, chlorate consuming process will frequently produce a liquor product containing the chlorate. Merchant chlorate plants serving many customers distributed over a wide area typically produce chlorate as a crystalline product. In this way, shipping costs are minimized and loss of residual chromium ion in the liquor is eliminated.

The sodium chloride salt used to prepare the brine for electrolysis to sodium chlorate generally contains impurities which, depending on the nature of the impurity and certain of the production techniques employed, can give rise to plant operational problems which are familiar to those skilled in the art. The means of controlling these impurities are varied and include purging them out of the system into alternative processes or to the drain, precipitation by conversion to insoluble salts, or crystallization or ion exchange treatment. The control of anionic impurities presents more complex problems than that of cationic impurities.

Sulphate ion is a common ingredient in commercial salt. When such salt is used directly, or in the form of a brine solution, and specific steps are not taken to remove the sulphate, the sulphate enters the electrolytic system. Sulphate ion maintains its identity under the conditions in the electrolytic system and thus accumulates and progressively increases in concentration in the system unless removed in some manner. In chlorate plants producing a liquor product, the sulphate ion will leave with the product liquor. In plants producing only crystalline chlorate, the sulphate remains in the mother liquor after crystallization of the chlorate, and is recycled to the cells. Over time, the concentration of sulphate ion will increase and adversely affect electrolysis and cause operational problems due to localized precipitation in the electrolytic cells.

U.S. Pat. No. 4,702,805, Burkell and Warren, issued Oct. 27, 1987, describes an improved method for the control of sulphate in an electrolyte stream in a crystalline chlorate plant, whereby the sulphate is crystallized out. In the production of crystalline sodium chlorate according to U.S. Pat. No. 4,702,805, sodium chlorate is crystallized from a sodium chlorate rich liquor, and the crystals are removed to provide a mother liquor comprising principally sodium chlorate and sodium chloride, together with other components including sulphate and dichromate ions. A portion of the mother liquor is cooled to a temperature to effect crystallization of a portion of the sulphate as sodium sulphate in admixture with sodium chlorate. The crystallized admixture is removed and the resulting spent mother liquor is recycled to the electrolytic process.

It has been found subsequently, that the crystallized admixture of sulphate and chlorate obtained from typical commercial liquors according to the process of U.S. Pat. No. 4,702,805 may be discoloured yellow owing to the unexpected occlusion of a chromium component in the crystals. The discolouration cannot be removed by washing the separated admixture with liquors in which the crystallized sulphate and chlorate are insoluble. This represents a limitation to the process as taught in U.S. Pat. No. 4,702,805. It will be appreciated that the presence of chromium in such a sulphate product could be detrimental in subsequent utilization of this product.

Dichromate used in chlorate manufacture is an expensive chemical and, although processes have been developed for removal of dichromate from chlorate-containing liquors, such processes for the removal of the dichromate from the liquor prior to removal of the sulphate would not be economical or efficient for the overall operation of the electrolytic process.

U.S. Pat. No. 4,636,376, of Maloney and Carbaugh, discloses removing sulphate from aqueous chromate-containing sodium chlorate liquor without simultaneous removal of significant quantities of chromate The chromate and sulphate-containing chlorate liquor having a pH in the range of about 2.0 to about 6.0 is treated with a calcium-containing material at a temperature of between about 40° C. and 95° C., for between 2 and 24 hours to form a sulphate-containing precipitate. The precipitate is predominantly glauberite, $Na_2Ca(SO_4)_2$.

SUMMARY OF THE INVENTION

Surprisingly, we have now found that crystals of sodium sulphate can be obtained substantially free of chromate (chromium VI), from aqueous liquors containing sulphate and a chromate (chromium VI), and, preferably, a halate.

It is an object of the present invention to substantially separate sulphate from a chromate (chromium VI) compound from an aqueous sulphate liquor containing a chromate species.

It is a further object of the present invention to substantially reduce the chromium VI contamination, or discoloration, of sulphate crystals obtained from a chromium VI-containing aqueous sulphate liquor.

It is a further object of the present invention to substantially reduce the chromium (VI) contamination of sodium sulphate admixed with sodium chlorate, which admixture has been separated from a liquor produced in an electrolytic process for sodium chlorate manufacture.

Accordingly, the invention provides an improved process for separating an alkali metal sulphate contained in an aqueous liquor from a chromium species dissolved in said liquor, said chromium species being defined as one that would be occluded with said alkali metal sulphate upon precipitation of said sulphate from said liquor at a pH greater than about 7, said improved process comprising adjusting the pH of said aqueous liquor to a value in the range from about 2.0 to about 6.5, cooling said liquor to a temperature sufficient to provide an aqueous slurry comprising precipitated sulphate substantially free of said chromium species, and removing said precipitated sulphate.

The solid particles may be in the form of crystals, in which case the step of cooling said liquor may be considered to be a crystallization process. If the solid particles are amorphous, then the step of cooling may be considered to be a precipitation process. The alkali metal sulphate is preferably, sodium sulphate.

The chromium species may be any such species that is dissolved in the same liquor as containing the sulphate, and which would become occluded in the sulphate should it be crystallized or precipitated from the liquor at a pH of greater than about 7; and which species would otherwise remain dissolved in said liquor upon crystallization or precipation of the sulphate compound from the liquor at a liquor pH in the range from about 2.0 to about 6.5. The chromium species in the aqueous liquor is unwanted as part of the solid particles that crystallize or precipitate from the pH adjusted liquor. It is highly desirable that essentially all of the chromium remain dissolved in the liquor. In the process of the present invention contamination of the solid particles is substantially reduced. It will be understood that the term "contained" as used herein in reference to a compound, component, species and the like, being contained in a liquor, embraces, but is not limited to, the term "dissolved".

In a preferred feature of the present invention, a metal halate or perhalate, is additionally contained in the aqueous liquor. As part of this feature, the solid particles that form may further comprise said halate or perhalate. The alkali metal chlorate is preferably sodium chlorate. Thus, the metal sulphate upon crystallization or precipitation may be in admixture with the chlorate dissolved in the liquor that co-crystallizes or co-preciptates with the sulphate compound.

In yet a further preferred feature of the present invention the aqueous liquor contains a chlorate, a sulphate and a chromium species, obtained in the electrolysis of chloride in an electrolytic cell. Preferably, the aqueous liquor is a mother liquor obtained after a portion of chlorate has been removed from a chlorate-rich liquor produced by the electrolysis of chloride in an electrolytic cell. Preferably said chorate is sodium chlorate, said sulphate compound is sodium sulphate and said chromium species is chromium (VI), for example, chromate.

The removal of the solid particles from the liquor may be accomplished using any conventional means for removing a solid from a liquid, including filtration to collect the solid, decantation after settling, or centrifugation followed by decantation.

DETAILED DESCRIPTION OF THE INVENTION

In the practice of the process of the present invention the pH of the liquor is adjusted to a value selected in the range from about 2.0 to about 6.5, preferably from about 3.0 to about 5.5, and the liquor cooled, preferably, to a temperature selected in the range from about 5° C. to about −5° C. The pH of the liquor may be adjusted to the desired pH by the addition of sufficient suitable inorganic acid. Any inorganic acid may be employed in the process of this invention that is capable of controlling the pH of the resultant liquor in the desired range, and does not act as a reducing agent for any metal chlorate and hexavalent chromium present in the liquor. Suitable inorganic acids are hydrochloric acid, sulphuric acid and nitric acid. The acid for addition generally has a concentration in the range from about 5% to 75% inorganic acid by weight in aqueous solution.

As stated, hereinbefore, it is an object of the present invention to substantially reduce the chromium ion contamination of an alkali metal sulphate and in particular to substantially reduce the chromium (VI) contamination of sodium sulphate separated from an aqueous chlorate-containing liquor produced in the electrolytic process for chlorate manufacture. In this fashion, the yellow discolouration of the separated sulphate compound, owing to the occlusion of chromium (VI), such as dichromate, may be substantially reduced. It will be understood that a complete elimination of the chromium contamination, particularly dichromate contamination, of the separated sulphate, while being desirable, is not essential in order to benefit from the process of the present invention.

The process of the present invention is particularly useful in connection with the improved process of sodium chlorate production disclosed in U.S. Pat. No. 4,702,805, wherein the sulphate concentration in the system is controlled.

Accordingly, in a further aspect of the present invention, there is provided an improved continuous process for the production of crystalline sodium chlorate by the electrolysis of sodium chloride in an electrolytic process comprising:

(a) feeding water and sodium chloride contaminated with sulphate to a reaction zone containing a chromium species wherein said sodium chloride is electrolyzed to chlorine and sodium hydroxide, said chlorine and sodium hydroxide are reacted to form sodium hypochlorite which is then reacted to produce a sodium chlorate-rich liquor;

(b) cooling said sodium chlorate-rich liquor to crystallize out a portion of said sodium chlorate to provide crystals of sodium chlorate and a mother liquor comprising sodium chlorate, sodium chloride, chromium species and sulphate;

(c) removing said crystals of sodium chlorate;

(d) recycling a major portion of said mother liquor to said reaction zone;

(e) cooling a minor portion of said mother liquor to a temperature to effect crystallization therefrom of a portion of said sulphate as sodium sulphate in admixture with said sodium chlorate, and production of a cold saturated solution of spent mother liquor comprising said chromium species;

(f) removing said crystallized admixture from said spent mother liquor;

(g) recycling spent mother liquor to said reaction zone;

wherein the amount of said minor portion of said mother liquor is selected such that the sulphate concentration in said reaction zone is maintained substantially constant at a predetermined level;

the improvement comprising adjusting the pH of said minor portion of said mother liquor in the range from about 2.0 to about 6.5 prior to further cooling, whereupon said cooling effects precipitation of a portion of said sulphate substantially free of said chromium species.

Also, in the process for the production of crystalline sodium chlorate by the electrolysis of sodium chloride as described hereinabove, the process provides that wherein a calcium-containing material is additionally contained in said mother liquor, then said crystallized sulphate comprises essentially no glauberite.

The following example illustrates a preferred embodiment of the invention in order that the invention may be better understood, without any intention of limiting the invention.

EXAMPLE

An aqueous solution (I) was prepared containing sodium chlorate (30.9%), sodium chloride (12.5%), sodium sulphate decahydrate (3.9%), and sodium dichromate dihydrate (0.5%). A second aqueous solution (II) was prepared containing sodium chlorate (40.0%) and water (60.0%). Percentage values are by weight of solution.

A sample of solution (I) was taken and its pH adjusted with hydrochloric acid to 4. The solution was placed in an agitated vessel located in a refrigerated bath and cooled to $-10°$ C. During the cooling period seed crystals of sodium chlorate (0.05%) and sodium sulphate (0.05%) were added. The resultant crystal slurry was filtered off and washed with solution (II) refiltered and rewashed. Samples of the recovered crystals were white after washing. Samples of the filter cake were analyzed after each washing. The results are given in Table 1 with comparative data for crystallization procedures as described herein but carried out using sodium hydroxide base to provide solutions at pH 7 and pH 10, the latter value being typical of liquors fed to industrial crystallizers.

with said alkali metal sulphate upon precipitation of said sulphate from said liquor at a pH greater than about 7, said improved process comprising adjusting the pH of said aqueous liquor to a value in the range from about 2.0 to about 6.5, cooling said liquor to a temperature sufficient to provide an aqueous slurry comprising precipitated sulphate substantially free of said chromium species, and removing said precipitated sulphate; and provided that wherein a calcium-containing material is additionally contained in said aqueous liquor, than said precipitated sulphate comprises essentially no glauberite.

2. A process as claimed in claim 1, wherein said aqueous liquor further contains a halate o perhalate.

3. A process as claimed in claim 2, wherein an alkali metal chlorate is additionally contained in said aqueous liquor.

4. A process as claimed in claim 1, wherein said precipitated sulphate further comprise an alkali metal chlorate.

5. A process as claimed in claim 1, wherein said aqueous liquor is produced by the electrolysis of chloride in an electrolytic cell.

6. A process as claimed in any one of claims 1 to 5, wherein said chlorate is sodium chlorate.

7. A process as claimed in any one of claims 1 to 5, wherein said sulphate is sodium sulphate.

8. In a continuous process for the production of crystal sodium chlorate by the electrolysis of sodium chloride in an electrolytic process comprising:

(a) feeding water and sodium chloride contaminated with sulphate to a reaction zone containing a chromium species wherein said sodium chloride is electrolyzed to chlorine and sodium hydroxide, said chlorine and sodium hydroxide are reacted to form sodium hypochlorite which is then reacted to produce a sodium chlorate-rich liquor;

(b) cooling said sodium chlorate-rich liquor to crystallize out a portion of said sodium chlorate to provide crystals of sodium chlorate and a mother liquor comprising sodium chlorate, sodium chloride, chromium and sulphate;

(c) removing said crystals of sodium chlorate;

(d) recycling a major portion of said mother liquor to said reaction zone;

(e) cooling a minor portion of said mother liquor to a

TABLE 1

Effect of crystallization pH for sodium chlorate/sodium sulphate recovery

| | Test | | | | | |
|---|---|---|---|---|---|---|
| | 1 | | 2 | | 3 | |
| | pH | | | | | |
| | 4 | | 7 | | 10 | |
| | After First Wash | After Second Wash | After First Wash | After Second Wash | After First Wash | After Second Wash |
| ClO$_3$ as KClO$_3$ % | 82.7 | 82.9 | 81.8 | 82.1 | 81.2 | 81.5 |
| Cl as KCl % | 0.5 | 0.1 | 0.4 | 0.1 | 0.5 | 0.1 |
| SO$_4$ as Na$_2$SO$_4$ % | 16.8 | 17.0 | 16.2 | 16.3 | 16.3 | 16.4 |
| Cr as Na$_2$C$_2$O$_7$ ppm | 180.0 | 48.0 | 1600.0 | 1600.0 | 2000.0 | 2000.0 |

Results are quoted on a dry solids basis.

The embodiments of the present invention in which an exclusive property or privilege is claimed are defined as follows.

1. An improved process for separating an alkali metal sulphate contained in an aqueous liquor from a chromium species dissolved in said liquor, said chromium species being defined as one that would be occluded temperature to effect crystallization therefrom of a portion of said sulphate as sodium sulphate in admixture with said sodium chlorate, and production of a cold saturated solution of spent mother liquor comprising said chromium species;

(f) removing said crystallized admixture from said spent mother liquor;

(g) recycling spent mother liquor to said reaction zone;

wherein the amount of said minor portion of said mother liquor is selected such that the sulphate concentration in said reaction zone is maintained substantially constant at a predetermined level;

the improvement comprising adjusting the pH of said minor portion of said mother liquor in the range from about 2.0 to about 6.5 prior to further cooling, whereupon said cooling effects precipitation of a portion of said sulphate substantially free of said chromium species; and provided that wherein a calcium-containing material is additionally contained in said mother liquor, then said precipitated sulphate comprises essentially no glauberite.

9. A process as claimed in claim 1 or claim 8, wherein said chromium species is chromium (VI).

* * * * *